T. J. BOWLKER.
APPARATUS FOR SUBMARINE SIGNALING.
APPLICATION FILED MAR. 26, 1908.
964,380.
Patented July 12, 1910.
2 SHEETS—SHEET 1.
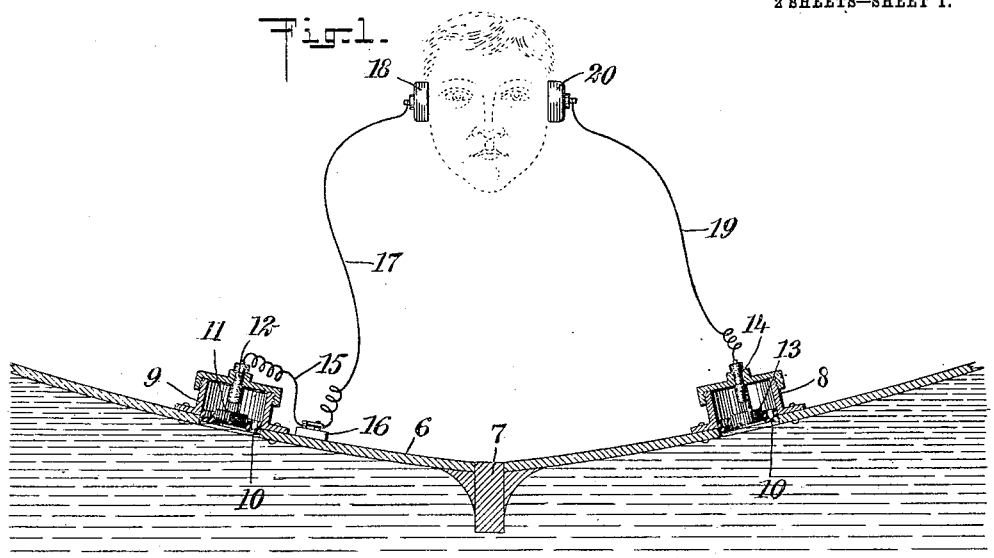
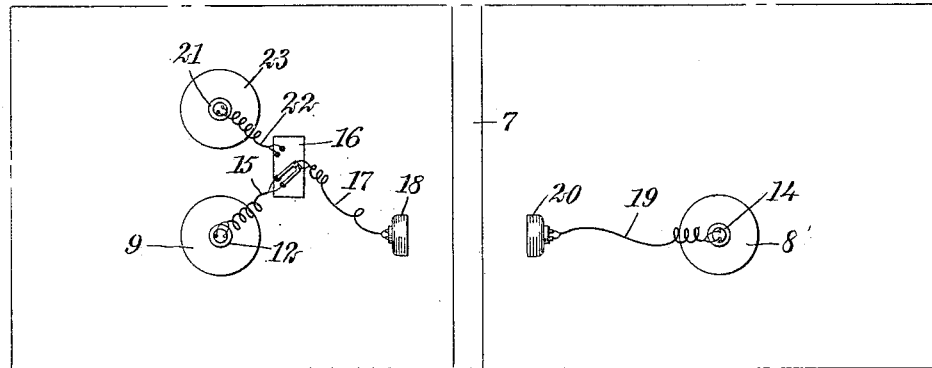
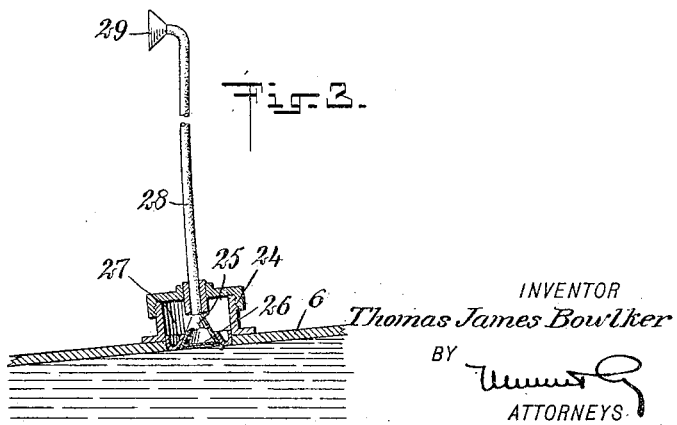
WITNESSES
INVENTOR
Thomas James Bowlker
BY
ATTORNEYS T. J. BOWLKER.
APPARATUS FOR SUBMARINE SIGNALING.
APPLICATION FILED MAR. 26, 1908.
964,380.
Patented July 12, 1910.
2 SHEETS—SHEET 2.
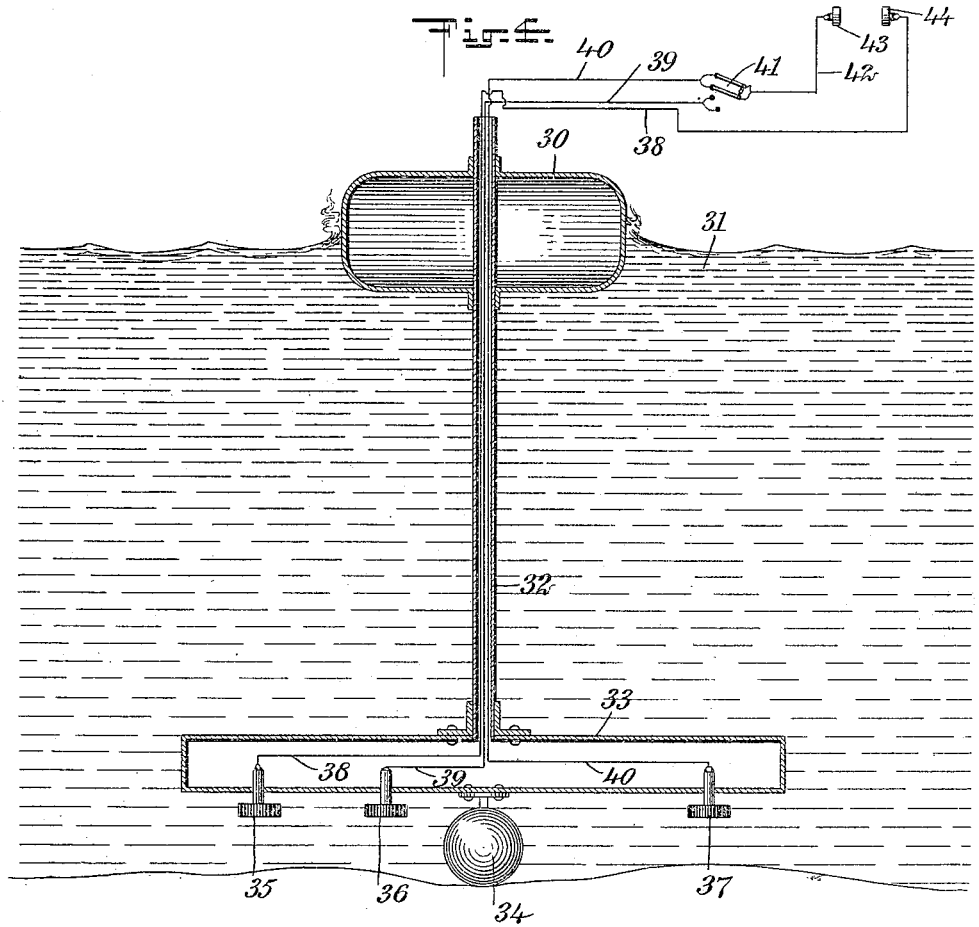
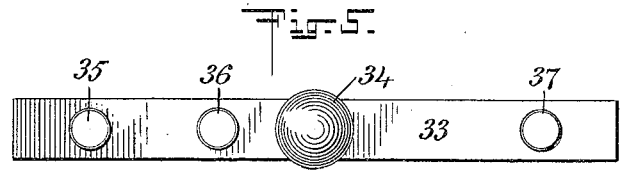
WITNESSES
INVENTOR
Thomas James Bowlker
BY
ATTORNEYS

UNITED STATES PATENT OFFICE.

THOMAS JAMES BOWLKER, OF BOSTON, MASSACHUSETTS.

APPARATUS FOR SUBMARINE SIGNALING.

964,380.   Specification of Letters Patent.   Patented July 12, 1910.

Application filed March 26, 1908. Serial No. 423,374.

*To all whom it may concern:*

Be it known that I, THOMAS JAMES BOWLKER, a subject of the King of Great Britain, and a resident of Boston, in the county of Suffolk and State of Massachusetts, have invented a new and Improved Apparatus for Submarine Signaling, of which the following is a full, clear, and exact description.

My invention relates to submarine signaling, my more particular object being to enable the operator to determine accurately the direction of sounds received.

In carrying out the principles of my invention, I take advantage of the fact that in water, as well as in air, different portions of the sound wave reach different objects at different moments, and that the interval of time elapsing between the arrival of a sound wave or group of sound waves at one point, and the arrival thereof at another point in close proximity to the first, may be an indication as to the direction from which the sound wave arrives.

I have discovered that the apparent direction of sound in air is determined principally by the time interval between the arrival of a given sound wave at one of the ears of the hearer, and the arrival of that same sound wave at the other ear. I have also found that the direction of the sound wave may be determined if, instead of the sound waves affecting the ears directly, they are allowed to impinge upon instruments capable of conveying the sounds to the ears, and that selectivity of direction is still maintained, provided such instruments are so situated and arranged that the sound waves, in striking them successively, preserve the same time relation as that above described, with reference to the striking of the ears of the observer in air. I further find that the direction of sounds arriving through water may be determined if the sensitive instruments representing and leading to the observer's ears are placed far enough apart to compensate for the difference in ratio of the velocity of sound waves in water, as compared with the velocity of sound waves in air.

Reference is to be had to the accompanying drawings forming a part of this specification, in which similar characters of reference indicate corresponding parts in all the figures.

Figure 1 is a cross section, partly diagrammatic, representing the hull of a vessel provided with a pair of telephonic receivers and with cords connecting the latter with receivers applied to the ears of the operator; Fig. 2 is a diagrammatic plan of the mechanism shown in Fig. 1; Fig. 3 is a section showing a pneumatic tube used as a substitute for a receiver and telephone circuit; Fig. 4 is a vertical section showing another form of my invention, a buoy in this instance supporting the frame carrying telephone receivers and weighted at its bottom, the frame being free to turn in order that it may be adjusted relatively to the sound waves arriving through the water; and Fig. 5 is an inverted plan, showing the elongated box to which the telephonic transmitters, used as a part of the receiving apparatus, are applied.

It will be understood that the telephonic cords shown in my apparatus represent twin wires insulated from each other. This feature being old and in common use, and forming no part of my invention, needs no detailed description.

The hull of a vessel is shown at 6 and the keel thereof at 7. Stuffing boxes 8, 9, are each provided with a waterproof packing 10, and are spaced apart. A waterproof transmitter 11 is mounted within the stuffing box 9 and is engaged by a rubber sleeve 12. The purpose of this rubber sleeve is not to keep out the water, which is done by the packing 10, but is rather to prevent the transmitter 11 from being affected by any jarring sounds made upon the vessel. Another waterproof transmitter 13, is mounted within the stuffing box 8 and similarly provided with a rubber sleeve 14. A double cord 15 leads to a switch 16 and from the latter a double cord 17 leads to a receiver 18, and the transmitter 13 is connected by a double cord 19 with a receiver 20. A third transmitter 21 (see Fig. 2), of the kind above described, is located a little to the rear of the two receivers 18, 20, which are disposed directly abeam. The transmitter 21 is connected by a double cord 22 with the switch 16. The inductance of the cords 15 and 19 is so adjusted that when sounds come from a point directly ahead, the sensation at the ears of the observer is that the origin of sound is directly ahead.

Since the ratio of velocity of sound in water, as compared with sound in air, is approximately four to one, I place the transmitters 11, 13 apart a distance representing four times the distance between the ears of the operator, or at a distance not much greater than this. Suppose, now, that the receiver 18 is in communication with the transmitter 11, and the receiver 20 with the transmitter 13, and further that the receivers 18, 20 are applied to the ears of the operator, as indicated in Fig. 1. Sounds, we will say, now arrive from a distance through the water. The effect noted can perhaps be better understood by considering the action of a single sound wave. This wave, we will assume, strikes the transmitter 13 before it strikes the transmitter 11. The result is that the receiver 20 is energized earlier than the receiver 18, by a time period corresponding exactly to the difference between the moment of arrival of a sound wave in air to one ear of the operator, as compared with the arrival of that same sound wave at his other ear, provided the sound had traveled directly to his ears through air from the source of sound. Hence, the operator, in hearing the sound, detects its direction in substantially the same manner that he would detect it if he hears it in air. Since, however, a difficulty might arise in determining whether sounds are ahead or in the rear of the vessel, the additional transmitter 21 is brought into use by aid of the switch 16. Since the sound is coming from a point either ahead or behind the vessel, it follows that the transmitter 21 must be a little nearer to or a little farther from the source of the sounds than is the case with the other transmitter, and by noting the change in direction of the sounds when using the transmitter 21 the operator can judge whether the sounds come from a direction ahead or from the opposite direction. The transmitter 21 is protected by a stuffing box 23 from being affected by vibrations of the hull of the vessel and also from the effects of sounds coming otherwise than through the water.

In the form shown in Fig. 3, the hull 6 of the vessel is provided with a stuffing box 24 in which is mounted a mouthpiece 25 provided with a diaphragm 26 and protected by a packing 27. From the mouthpiece 25 a tube 28 leads upwardly to an ear piece 29. The arrangement shown in Fig. 3 constitutes a pneumatic tube, and a number of such tubes can be substituted for the receivers, the location of the stuffing boxes and the general action of the device being similar to that of the mechanism shown in Fig. 2.

In Fig. 4 a buoy 30 floats upon the water 31 and is provided with a tube 32 extending vertically through the buoy. Supported upon the lower end of the tube 32 is a box 33 having a general oblong form. Fig. 5 shows this box as viewed from its under side. A weight 34 prevents the box from rising and steadies it in such position that the tube 32 remains as nearly vertical as practicable.

At 35, 36, 37 are transmitters to which are connected double cords 38, 39, 40. The double cords 39, 40 lead to a switch 41, and from the latter a double cord 42 leads to a receiver 43. The double cord 38 leads to a receiver 44.

The device shown in Figs. 4 and 5 is used as follows: The box 33 is turned by rotating the tube 32 and thus brought into such position that the transmitters lie in a vertical plane, the direction of which is known. The transmitters 35, 36 are about two feet apart, while the transmitter 37 is spaced apart from the transmitter 36 by a somewhat greater distance. Now, by maintaining the transmitter 35 always in communication with the receiver 44 and by alternately switching in either of the two receivers 36, 37, so as to connect it with the receiver 43, an accurate estimate as to the direction of the source of the sound can be made. The inductance of the wires to the receivers, is adjusted so that when a source of sound is dead ahead, it appears to be so whichever pair of transmitters is used.

It will be understood that I do not limit myself to the particular arrangement of the parts as above described, nor to any particular construction of transmitter, receiver or pneumatic tube. Neither do I limit myself to the precise construction of any part shown in instances where the art, as now understood, permits the substitution of some other device capable of acting substantially the same way.

For convenience, in my claims I designate the mouthpiece 25 as a transmitter, and the ear piece 29 as a receiver, these terms, in their relation to Fig. 3, being understood in their telephonic meaning.

Having thus described my invention, I claim as new and desire to secure by Letters Patent:

1. The combination of a pair of transmitters submerged in water and sensitive to sound waves passing through said water, a pair of receivers connected with said transmitters and adapted to be applied to the ears of an operator, and connections from said transmitters to said receivers, said transmitters being spaced apart by a distance representing the proximate distance apart of said receivers multiplied by the ratio of velocity of sound in water as compared with the velocity of sound in air.

2. The combination of a pair of transmitters submerged under the surface of water and adapted to be actuated by sound waves arriving through said water, a pair of receivers adapted to be applied to the ears of an operator, and a connection from each receiver to one of said transmitters, said transmitters being spaced apart approximately four times as far as said receivers are spaced apart.

3. The combination of a pair of transmitters submerged under the surface of water and adapted to be actuated by sound waves arriving through said water, a pair of receivers adapted to be applied to the ears of an operator, separate connections from said receiver to said transmitters, said transmitters being spaced apart approximately four times as far as said receivers are spaced apart, a third transmitter located at some other point fixed relatively to said first-mentioned pair of transmitters, and means controllable at will for substituting said third transmitter for one of said pair.

4. The combination of a plurality of transmitters submerged under water for the purpose of receiving sounds therefrom, and a pair of receivers for reproducing the sounds, one of the receivers being always in communication with one transmitter and the other adapted to be placed in communication with any one of several transmitters.

5. The combination of a pair of receivers adapted to be applied to the ears of an observer, a pair of transmitters connected with said receivers and submerged below a water level, said transmitters having portions exposed directly to the water and sensitive to sound waves passing through said water, said transmitters being spaced apart by a distance approximately four times the distance apart of said receivers while in action, and a third transmitter adapted to be connected with one of said receivers for the purpose of assisting in the determination as to whether the sounds come from a particular direction.

6. The combination of a plurality of transmitters submerged under water for the purpose of receiving sounds therefrom, a pair of receivers for reproducing the sounds, a connection between a transmitter and one receiver, and means for alternately connecting two other transmitters with the other receiver.

7. The combination of a plurality of transmitters submerged under water for the purpose of receiving sounds therefrom, a pair of receivers for reproducing the sounds, a connection between a transmitter and one receiver, a switch with which two other transmitters are connected, and a connection between the switch and the other receiver.

In testimony whereof I have signed my name to this specification in the presence of two subscribing witnesses.

THOMAS JAMES BOWLKER.

Witnesses:
ELIZABETTO CHESSON,
JOSEPH W. BOSHER.